United States Patent [19]
Krude

[11] Patent Number: 5,830,070
[45] Date of Patent: Nov. 3, 1998

[54] CONSTANT VELOCITY UNIVERSAL JOINT

[75] Inventor: Werner Krude, Neunkirchen, Germany

[73] Assignee: GKN Automotive AG, Siegburg, Germany

[21] Appl. No.: 512,999

[22] Filed: Aug. 9, 1995

[30] Foreign Application Priority Data

Aug. 27, 1994 [DE] Germany .................. 44 30 514.1

[51] Int. Cl.[6] .................. F16D 3/20; F16D 3/26
[52] U.S. Cl. .................. 464/124; 464/109; 464/118; 464/905
[58] Field of Search .................. 464/109, 111, 464/112, 120, 122, 123, 124, 905, 117, 118

[56] References Cited

U.S. PATENT DOCUMENTS

| | | |
|---|---|---|
| 3,453,842 | 7/1969 | Rethwisch . |
| 4,507,100 | 3/1985 | Dore et al. .................. 464/124 X |
| 4,689,035 | 8/1987 | Orain .................. 464/109 X |
| 4,702,723 | 10/1987 | Orain .................. 464/120 |
| 5,299,981 | 4/1994 | Poulin et al. .................. 464/111 |
| 5,460,573 | 10/1995 | Krude .................. 464/111 |
| 5,525,111 | 6/1996 | Orain .................. 464/124 |

FOREIGN PATENT DOCUMENTS

| | | |
|---|---|---|
| 431883 | 12/1938 | Belgium . |
| 0520846A1 | 12/1992 | European Pat. Off. . |
| 1903600 | of 0000 | Germany . |
| 3521174C2 | 1/1987 | Germany . |
| 1-224525 | 9/1989 | Japan .................. 464/111 |
| 4-254019 | 4/1992 | Japan . |
| 4-337118 | 4/1992 | Japan . |
| 4-357328 | 12/1992 | Japan .................. 464/111 |
| 5-209632 | 5/1993 | Japan . |
| 2161246 | 1/1986 | United Kingdom . |

*Primary Examiner*—Daniel P. Stodola
*Assistant Examiner*—Eileen A. Dunn
*Attorney, Agent, or Firm*—Harness, Dickey & Pierce PLC

[57] ABSTRACT

A constant velocity universal joint for high-speed drives such as propeller shafts in motor vehicles has the outer joint part and the inner joint part held relative to one another in an optimum way so that they rotate centrally relative to one another at any angle occurring in operation. This is achieved in that the constant velocity universal joint is provided in the form of a so-called quadripode joint consisting of an outer joint part and an inner joint part which is supported by centering the cross member associated with the inner joint part by means of the arms thereof against respective stops in the outer joint part.

13 Claims, 9 Drawing Sheets

CONSTANT VELOCITY UNIVERSAL JOINT

FIELD OF THE INVENTION

The present invention relates to a constant velocity universal joint. More particularly, the present invention relates to a constant velocity universal joint of the quadripode type which is adapted for high speed operation.

BACKGROUND OF THE INVENTION

A constant velocity universal joint of the so-called quadripode type for highspeed drives is known (DE 3521174 C 2). A precondition for allowing constant velocity universal joints of the quadripode type to function consists in that, upon articulation of the joint, the existing geometry causes displacements of the projected axes of the joint parts, which have to be compensated for by suitable measures.

Such compensating measures may consist in providing a degree of freedom for the guiding grooves in which the arms of the inner joint part are received by means of supported rollers or in allowing the arms positioned on one axis to move relative to each other.

The aforementioned German patent specification thus proposes to pivotably arrange the guiding grooves which cooperate with corresponding teeth in the outer joint part. A connection in the opposite direction with the adjoining guiding grooves is provided by further teeth acting as coupling elements.

The purpose of the coupling elements is to ensure that the guiding grooves which adjoin one another carry out pivot movements which are of the same magnitude, but extend in the opposite directions.

According to a further proposal of the aforementioned German patent specification, the guiding grooves are pivotably received by only one bearing point in the outer housing.

A further proposal of the aforementioned German patent specification consists in arranging the arms in the inner joint part pivotably, with the guiding grooves in this case forming a fixed part of the outer joint part.

A further proposal regarding a constant velocity joint of the quadripode type has the objective of compensating for the vibrations caused by the movement of the guiding grooves, with the vibrating guiding grooves being arranged in such a way that they are loaded in the direction of the neutral position by the centrifugal forces occurring.

Both proposed solutions are disadvantageous in that it is not ensured that the outer joint part rotates relative to the inner joint part in a concentric way. As the connection between the inner joint part and outer joint part is complicated by a series of tolerances, the rotation of both parts relative to one another may lead to out-of-round running conditions which, in the most unfavorable case, may lead to detrimental out-of-balance situations. This is especially dangerous when the joints are intended for high-speed drives.

SUMMARY OF THE INVENTION

The present invention relates to a constant velocity universal joint, especially for high-speed driveshafts, consisting of an outer joint part provided with four uniformly circumferentially distributed guiding grooves. The four guiding grooves are pivotably supported around an axis extending parallel to the joint axis. Each groove comprises two guiding tracks which are arranged in the form of separate inserts. The circumferentially extending longitudinal sides of the guiding grooves are provided with coupling elements which extend parallel to the joint axis and which are held so as to be in operating engagement with corresponding coupling elements of the adjoining guiding grooves. The constant velocity universal joint further consists of an inner joint part comprising arms which correspond to the guiding grooves and which extend radially with reference to the joint axis. At least one roller is supported on each of the arms.

It is the object of the present invention to provide a constant velocity universal joint for high-speed drives, in the case of which, in any geometric alignment occurring under practical operating conditions, the outer joint part and inner joint part rotate centrally relative to one another.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figures 1, 1A, 2:
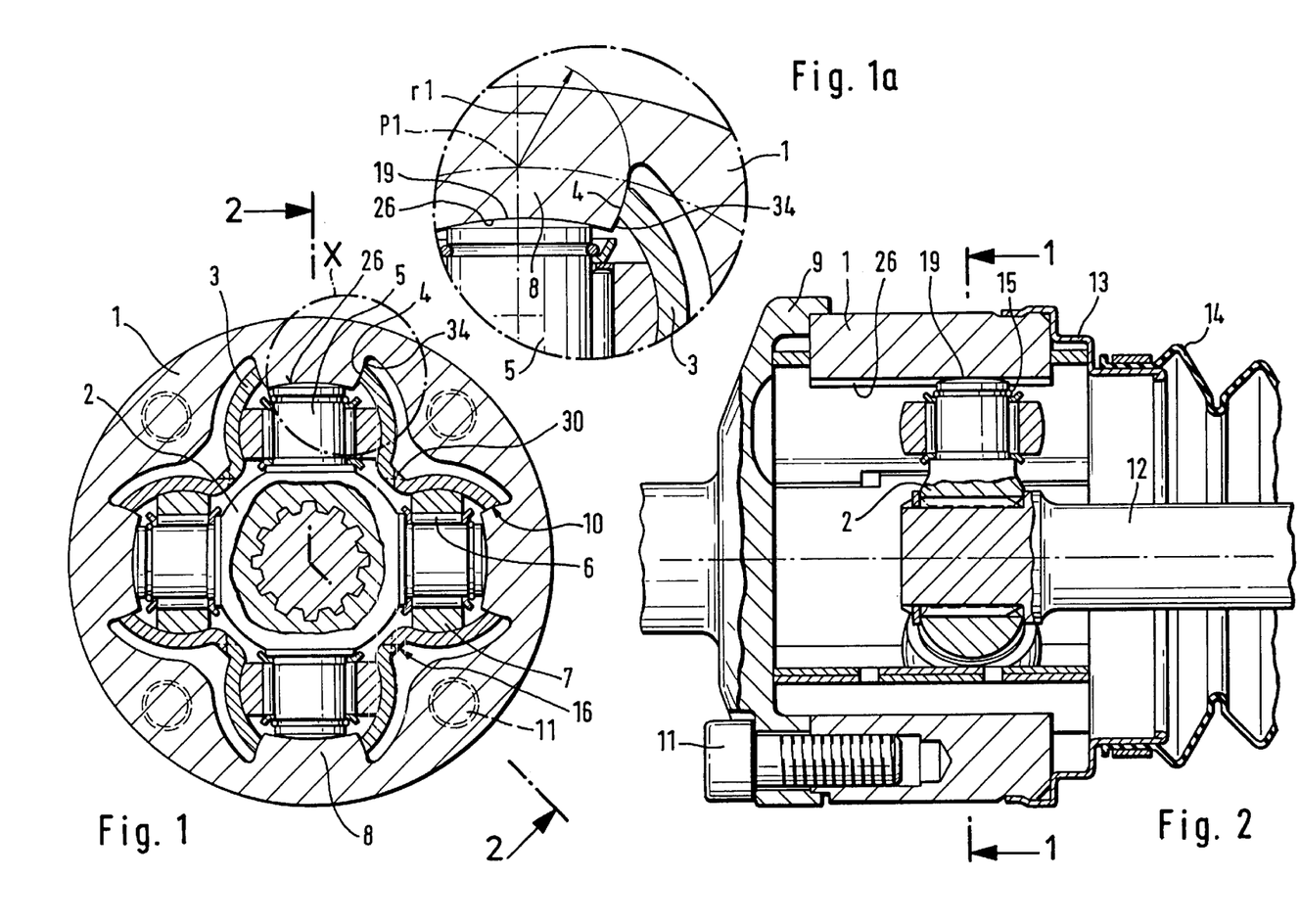
FIG. 1 is a cross-section through a constant velocity universal joint in accordance with the present invention taken in the direction of arrows 1—1 shown in FIG. 2, having guiding inserts pivotably held by supporting cams, FIG. 1 also shows a possible coupling element embodiment.
FIG. 1a is an enlarged illustration of detail X according to FIG. 1.
FIG. 2 is a longitudinal section taken if the direction of arrows 2—2 shown in FIG. 1 having a cover secured to the outer joint part.

Referring now to the drawings in which like reference numerals designate like or corresponding parts throughout the several views, there is shown in FIG. 1, a constant velocity universal joint comprising an outer joint part 1 and an inner joint part 2 received within outer joint part 1 so as to be pivotable relative thereto. Inner joint part 2 is provided with four arms 5, each of which extend radially relative to the joint axis and on each of which there is supported a roller 7 by means of a plurality of needle bearings 6. Each arm 5, by means of a head face 19 associated therewith, is supported on a counter face 26 which is arranged in outer joint part 1 so as to correspond to arm 5 and which is associated with a supporting projection 8 extending radially inwardly relative to the joint axis. A guiding insert 3, is supported on each projection 8 by a partially cylindrical, side face 4 of an aperture 10 shown in FIG. 16 extending through guiding insert 3. Side faces 4 are axially extending faces and mate with a surface 34 provided on the radial outer portion of supporting projection 8.

FIG. 1a shows the detail X in an enlarged form. At their axially extending side faces 34, supporting projections 8 comprise partially cylindrical portions formed around point P1 and having the radius r1. By means of their side faces 4 of apertures 10, guiding inserts 3 are thus pivotably supported on supporting projection 8 around the point P1.

FIG. 2 shows a longitudinal section through the constant velocity universal joint according to FIG. 1. A cover 9 is connected by a plurality of bolts 11 to outer joint part 1 and closes the constant velocity universal joint at one end. A shaft 12 for transmitting torque is inserted into inner joint part 2. At its radially open end, the constant velocity universal joint is provided with a covering 13 to which there is secured a convoluted boot 14 for sealing the constant velocity universal joint. Roller 7 and needles 6 are secured to the associated arm 5 by a retaining ring 15. In FIGS. 1 and 2, the coupling elements 16 are formed by alternately overlapping supporting elements 30 shown in FIGS. 15 and 16. Coupling elements 16 serve the same purpose as in the prior art as described above.

In accordance with the invention illustrated in FIGS. 1 and 2, the objective is achieved in that guiding inserts 3 associated with outer joint part 1 in the form of inserts, on their radially outer face with reference to the joint axis, are each provided with surfaces 4 whose longitudinal sides extend axially and which are substantially rectangular in shape, and that arms 5 of inner joint part 2, by means of radially outer, spherically convex head faces 19, are each supported on corresponding counter faces 26 of outer joint part 1 in the radial direction with reference to the joint axis. The solution in accordance with the present invention is advantageous in that inner joint part 2, by means of head faces 19 of its arms 5, is directly supported on corresponding counter faces 26 of outer joint part 1. In this way it is certain that production tolerances are not added up. This also applies to articulated joint positions. It is surfaces 4 provided on guiding inserts 3 on the radial outside which make it so easy to center the two joint parts 1 and 2 relative to one another.

In an advantageous embodiment of the invention, outer joint part 1 is provided with axially extending, radially inwardly directed supporting projections 8 whose surface 34 is partially cylindrical and which are each associated with guiding inserts 3. On the one hand, supporting projections 8, in the form of counter faces 26, ensure that the inner joint part 2 is centered relative to outer joint part 1 by means of head faces 19 of arms 5 and, on the other hand, they serve as supporting faces 34 for the pivoting movement of guiding inserts 3.

In a further advantageous embodiment of the invention, guiding inserts 3 embrace surfaces 34 of supporting projections 8 by means of their surfaces 4, with the center lines of the partially cylindrical surfaces 4 of supporting projections 8 constituting the pivot center lines for the pivot movement of guiding inserts 3. Because surfaces 4 of supporting projections 8 comprise a partially cylindrical cross-section, the pivot center line of the guiding tracks is easy to determine.

Figure 3:
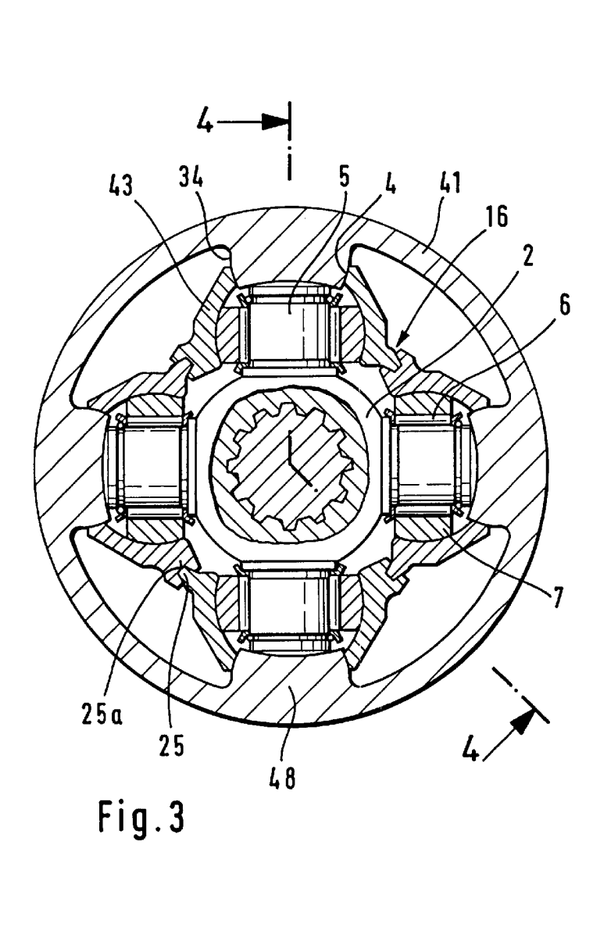
FIG. 3 is a cross-section through a constant velocity universal joint with a further embodiment of the coupling elements taken in the direction of arrows 3—3 shown in FIG. 4.

FIG. 3 shows a constant velocity universal joint in accordance with another embodiment of the present invention, having an outer joint part 41 with counter faces 426 on supporting projections 48, wherein the coupling elements 16 are formed by a tooth 25 corresponding with a tooth gap 25a located on respective guiding inserts 43.

Figure 4:
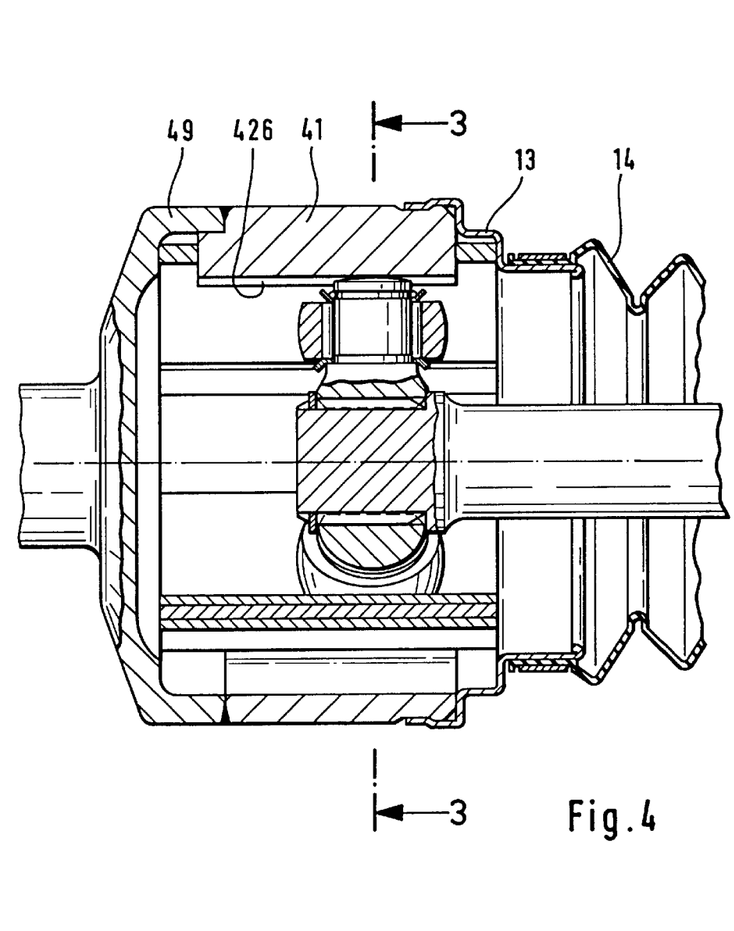
FIG. 4 is a longitudinal section taken in the direction of arrows 4—4 shown in FIG. 3, showing a cover welded to the outer joint part.

FIG. 4 is a longitudinal section through the joint according to FIG. 3 showing outer joint part 41 secured to cover 49.

Figures 5, 5A, 6:
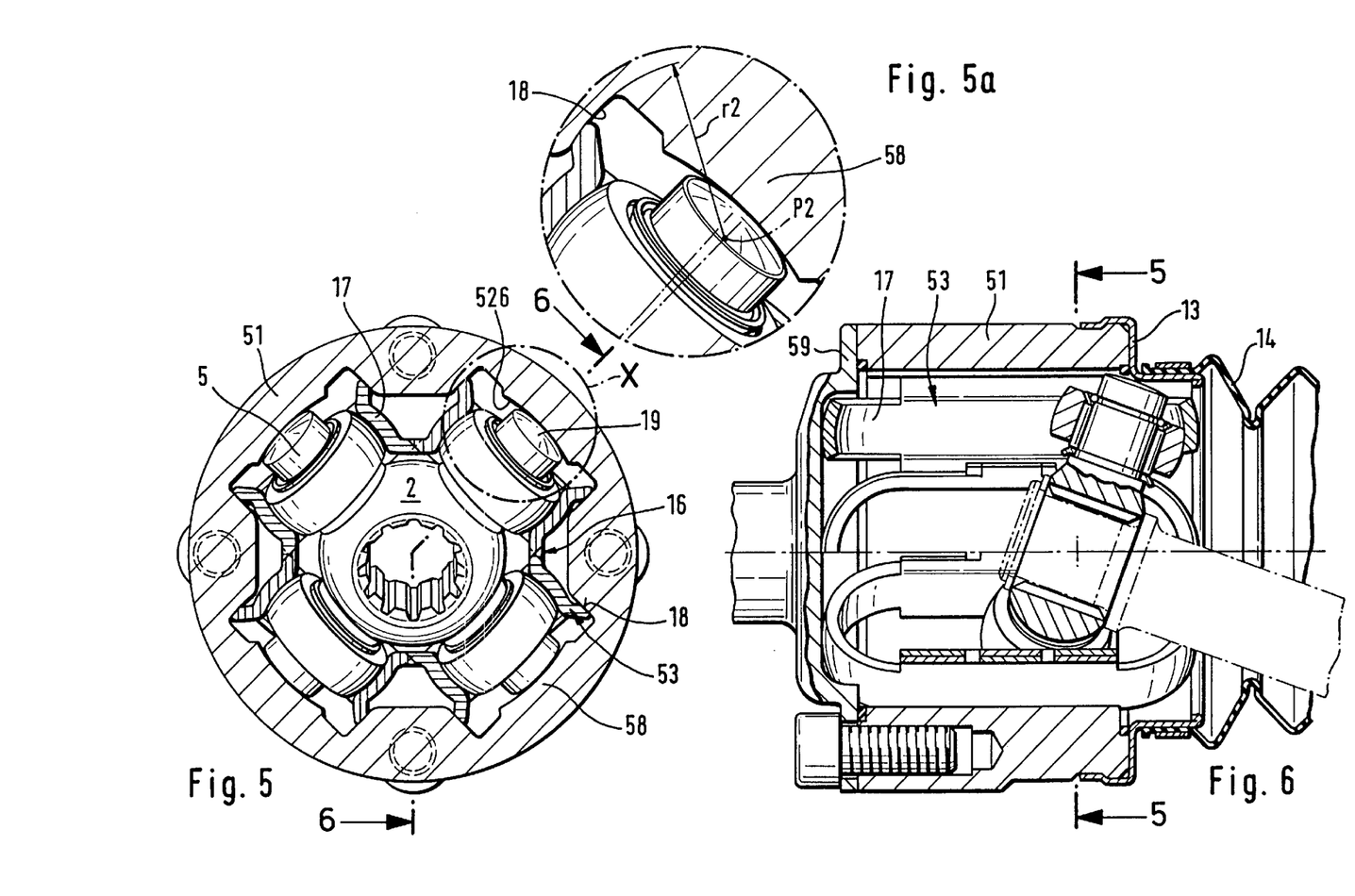
FIG. 5 shows an embodiment of a constant velocity universal joint wherein the guiding inserts are provided in the form of flattened oval rings and is taken in the direction of arrows 5—5 shown in FIG. 6.
FIG. 5a is an enlarged illustration of detail X according to FIG. 5.
FIG. 6 is a longitudinal section taken in the direction of arrows 6—6 shown in FIG. 5.

FIG. 5 shows a constant velocity universal joint in accordance with another embodiment of the present invention in the case of which the guiding inserts 53 are formed by a flattened i.e. oval ring 17. Head faces 19 of arms 5 are supported by counter faces 526 on supporting projections 58. Guiding inserts 53 provided in the form of flattened rings 17 are supported on partially cylindrical stops 18.

FIG. 5a shows the partially cylindrical portion of stops 18 in an enlarged form. Guiding inserts 53, in the form of the flattened rings 17, pivot around point P2 and have the radius r2.

FIG. 6 is a longitudinal section through the constant velocity universal joint according to FIG. 5 showing outer joint part 51 secured to cover 59.

According to a characteristic of the invention, it is proposed that guiding inserts 53 are provided in the form of a continuous, closed, flattened oval rings 17 and that, with reference to the joint axis, the radially outer ends are pivotably supported on axially extending, internally partially cylindrical stops 18 of outer joint part 51 which are arranged on both sides of the respective supporting projections 58. This solution makes it possible for a constant velocity universal joint of the quadripode type to feature any kind of plunging distance suitable for meeting existing requirements.

Figure 7:
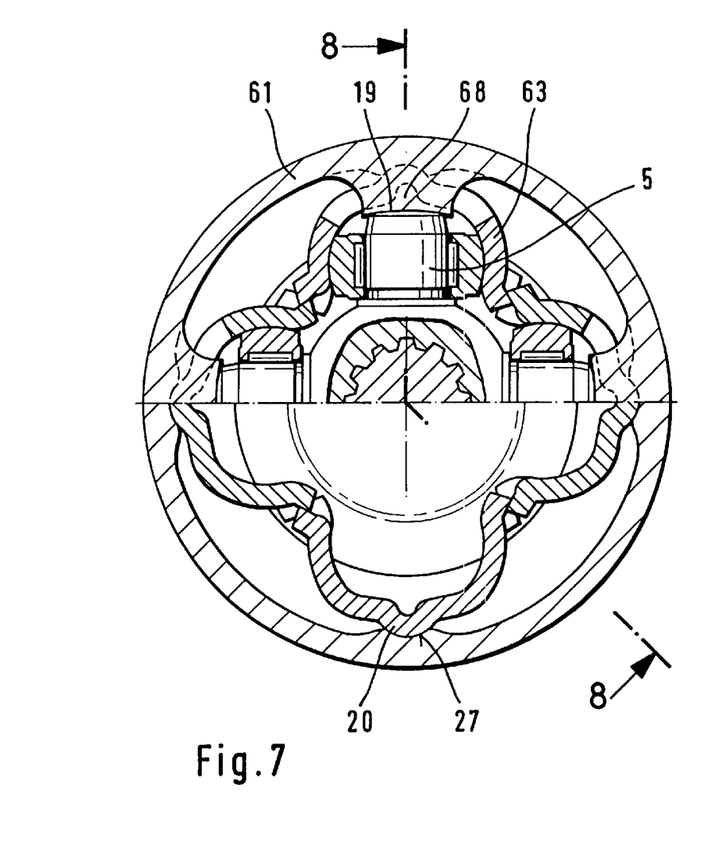
FIG. 7 shows a constant velocity universal joint designed as a fixed joint wherein the guiding inserts, at the axial ends of the joint, are pivotably supported by means of cam-shaped projections in recesses of the outer joint part and is taken in the direction of arrows 7—7 shown in FIG. 8.

FIG. 7 shows a constant velocity universal joint according to another embodiment of the present invention having an outer joint part 61 with spherically concave counter faces 626 on supporting projections 68. The constant velocity universal joint in FIG. 7 is designed as a fixed joint wherein a plurality of guiding inserts 63 are provided with cam-shaped projections 20 which extend radially outwardly with reference to the joint axis and which are arranged at both axial ends of the joint. Supporting projections 68 are provided with spherically concave counter faces 626 for head faces 19 of arms 5, thereby ensuring that the inner joint part pivots relative to the outer joint part around the joint center M. Cam-shaped projections 20 are received in recesses 27 of outer joint part 61. This kind of support ensures low-friction conditions.

Figure 8:
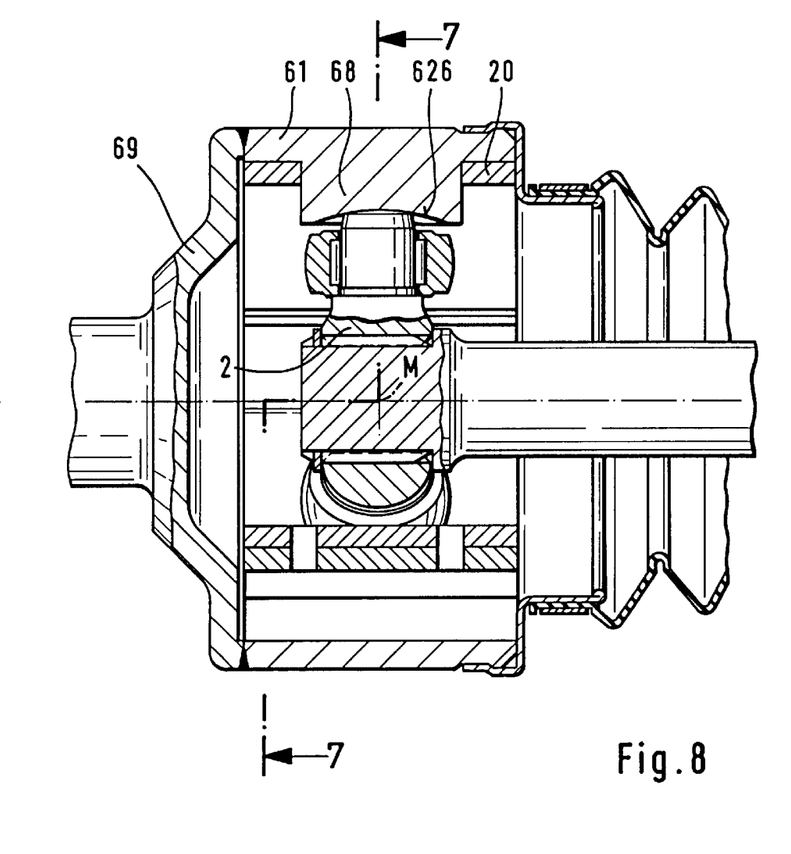
FIG. 8 is a longitudinal section taken in the direction of arrows 8—8 shown in FIG. 7.

FIG. 8 shows a longitudinal section through the constant velocity universal joint according to FIG. 7 showing outer joint part 61 secured to cover 69.

Figure 9:
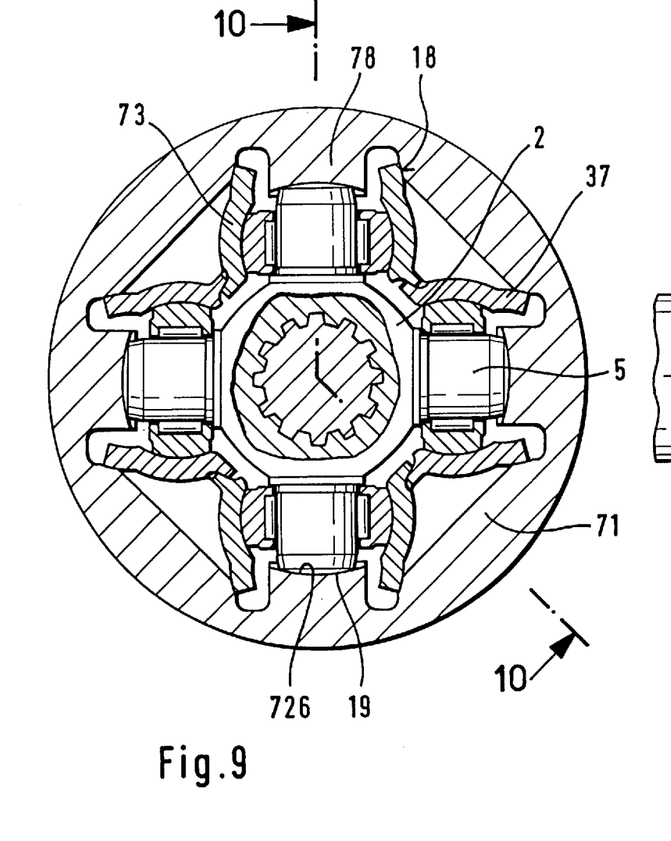
FIG. 9 is a cross-section through the constant velocity universal joint having guiding inserts supported on stops of the outer joint part and is taken in the direction of arrows 9—9 shown in FIG. 10.

FIG. 9 shows a constant velocity universal joint designed as a fixed joint wherein a plurality of guiding inserts 73 are provided in the form of flattened oval rings 37 which are also supported on stops 18 of the outer joint part 71.

Figure 10:
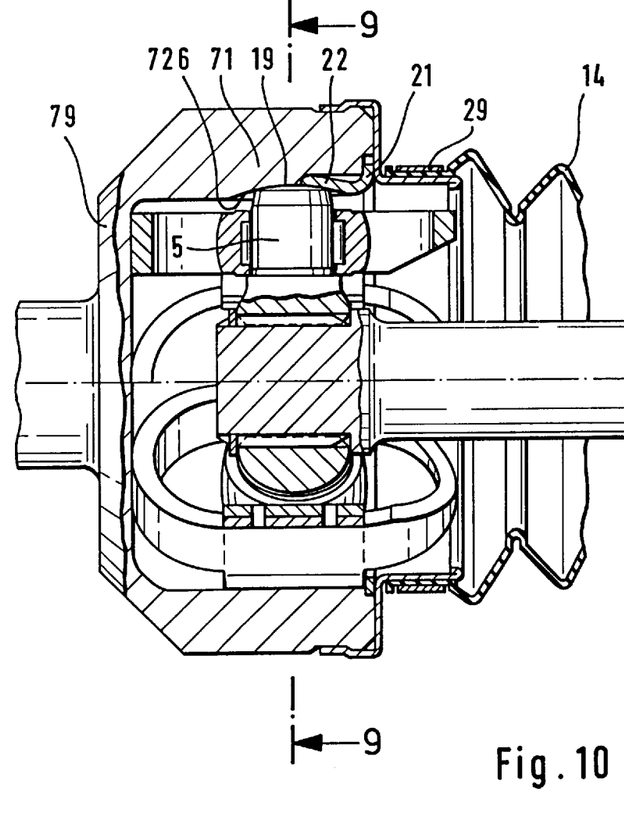
FIG. 10 is a longitudinal section taken in the direction of arrows 10—10 shown in FIG. 9.

FIG. 10 shows that outer joint part 71, at one end, is sealed by cover 79 provided so as to be integral therewith and, at the opposite end by cover 29 to which there is secured convoluted boot 14. At the open end of outer joint part 71 there is provided a ring 21 comprising four supporting lugs 22 corresponding to arms 5. Supporting lugs 22 in this case accommodate the part of spherically concave counter face 726, thus providing a supporting face for head face 19 of arms 5 towards the open end of the outer joint part 71.

The radial inner faces 726 of the supporting projections 78 constitute part of the concavely spherical counter faces which points to said open end of the outer joint part 71. Using ring 21 provided with lugs 22, from the point of view of assembly, constitutes a particularly inexpensive solution for obtaining a fixed joint.

Figure 11:
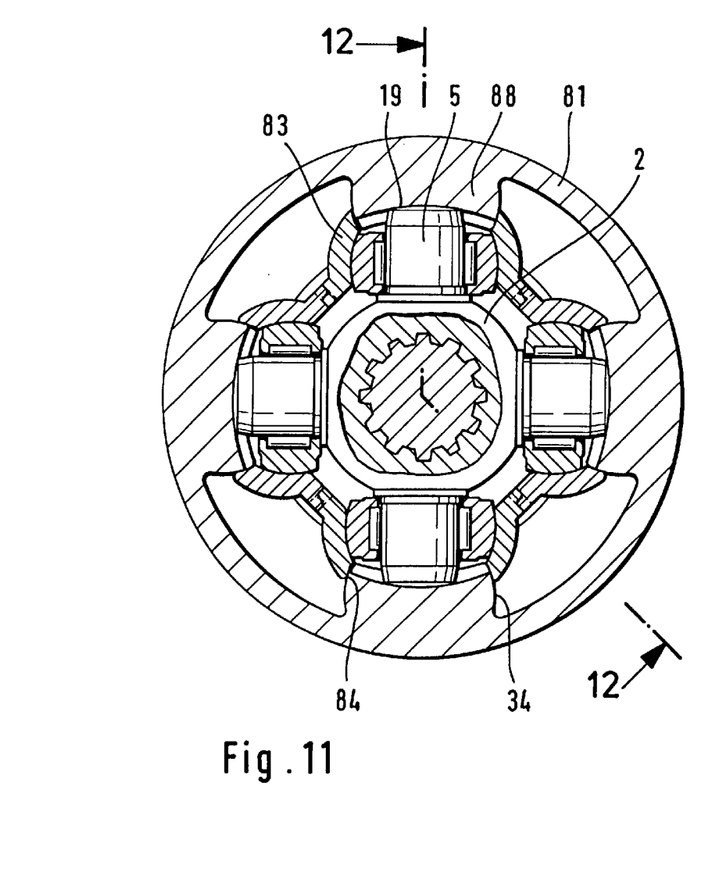
FIG. 11 shows a constant velocity universal joint designed as a fixed joint having guiding inserts pivotably guided on the supporting cams taken in the direction of arrows 11—11 shown in FIG. 12.

FIG. 11 shows a constant velocity universal joint according to another embodiment of the present invention. The constant velocity joint shown in FIG. 11 is designed as a fixed joint wherein guiding inserts 83, by means of their surfaces 84 are again pivotably supported on surfaces 34 of supporting projections 88.

Figure 12:
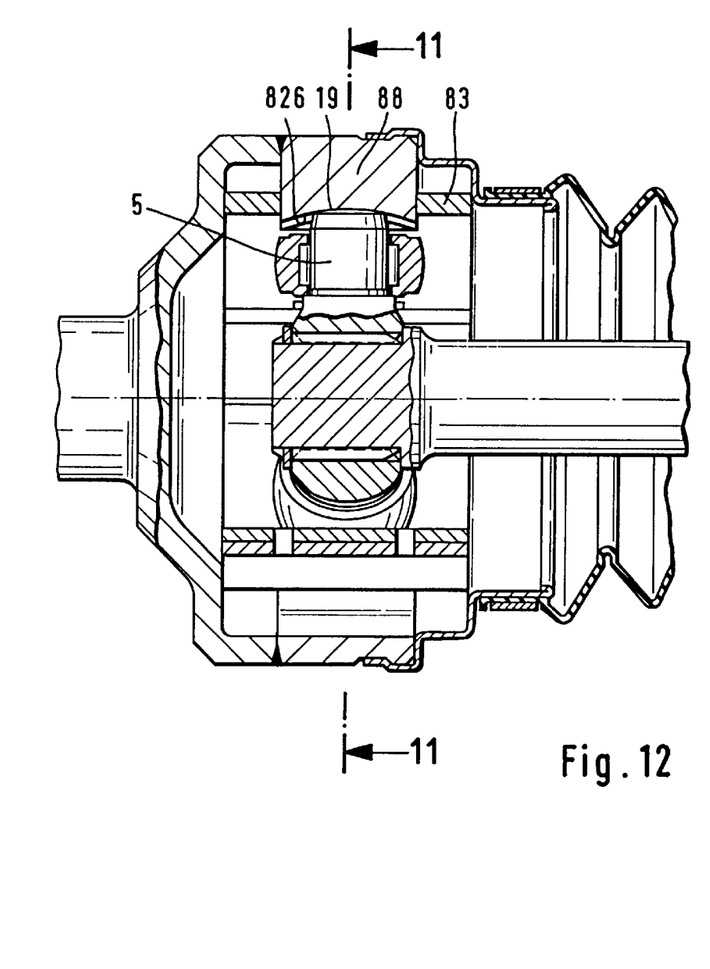
FIG. 12 is a longitudinal section taken in the direction of arrows 12—12 shown in FIG. 11.

FIG. 12 shows a longitudinal section through the joint according to FIG. 11, and it can be seen that the joint is again a fixed joint due to spherically concave counter surface 826.

According to a further characteristic of the invention, it is proposed that the radially inner counter faces 826 of supporting projections 88 are shaped as concavely spherical faces and that guiding inserts 83, by means of surfaces 84 associated therewith, are pivotably supported on surfaces 34 of supporting projections 88 and that arms 5 whose head faces 19 are partially spherically convex hold the center of articulation of inner joint part 2 in an axially defined position relative to outer joint part 84.

Figure 13:
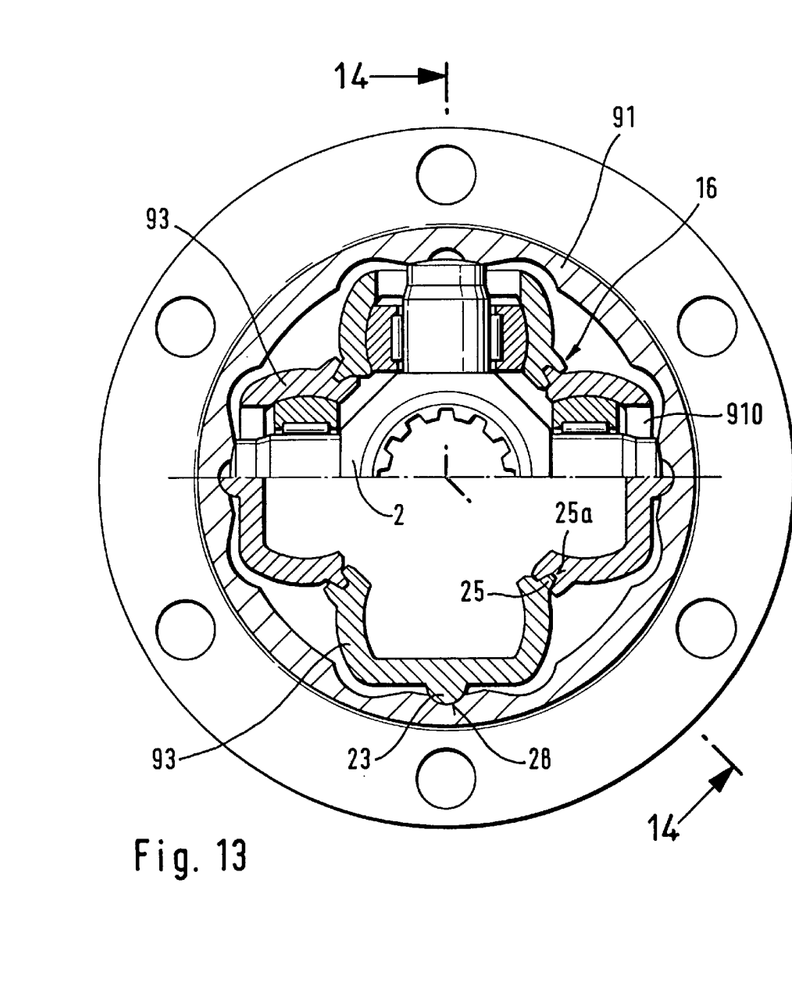
FIG. 13 is a cross-section through a constant velocity universal joint designed as a fixed joint wherein the guiding inserts are supported by means of semi-circular bearing cams in recesses of the outer joint part and is taken in the direction of arrows 13—13 shown in FIG. 14.
Figure 14:
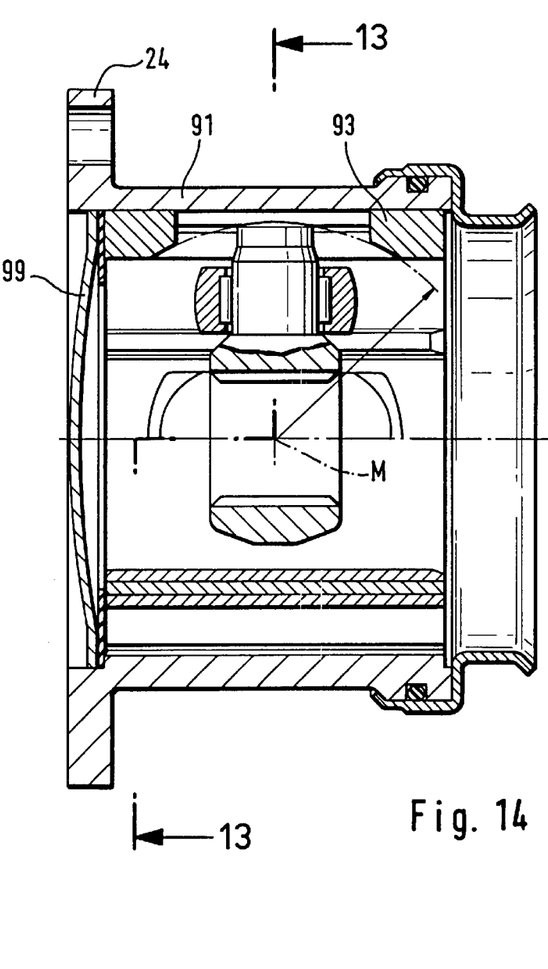
FIG. 14 is a longitudinal section taken in the direction of arrows 14—14 shown in FIG. 13.

FIG. 13 shows a constant velocity universal joint according to another embodiment of the present invention. The constant velocity joint shown in FIG. 13 is designed as a fixed joint. In this case, a plurality of guiding inserts 93 are pivotably supported in recesses 28 of outer joint part 91 by bearing projections 23 arranged at the two axial ends of outer joint part 91. A flange 24 is provided for the attachment of outer joint part 91 and cover 99 is press fit into flange 24 to close the constant velocity universal joint at one end. As illustrated in FIG. 14, inner joint part 2 again pivots around the joint center M.

According to this embodiment of the invention, it is proposed that the axial end portions of guiding inserts 93, on both sides of apertures 910, are provided with bearing projections 23 which, with reference to the joint axis, are shaped to be semi-circular on their radial outside and that bearing projections 23 engage corresponding recesses 28 of outer joint part 91, with guiding inserts 93 being pivotable around the center line of bearing projections 23. Again, the pivot center lines for guiding inserts 93 are restricted to bearing projections 23 provided at the ends of guiding inserts 93. Arms 5 of inner joint part 2 again pass through apertures 910 in guiding inserts 93 and are supported directly on corresponding counter faces 926 of the outer joint part 91.

Figure 15:
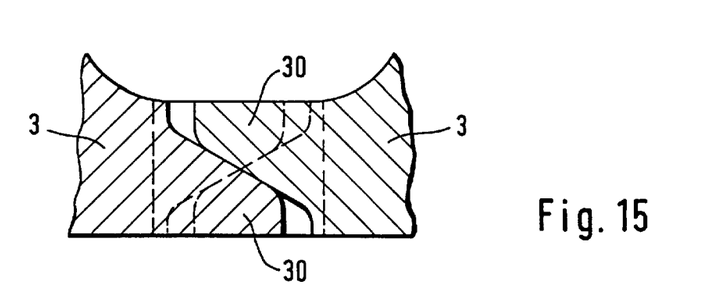
FIG. 15 shows an embodiment of the coupling elements with supporting lugs alternately overlapping in partial regions in opposite directions.

FIG. 15 shows the cooperation between supporting elements 30 of coupling elements 16 of guiding inserts 3 which, in partial regions, axially alternately overlap in opposite directions.

Figure 16:
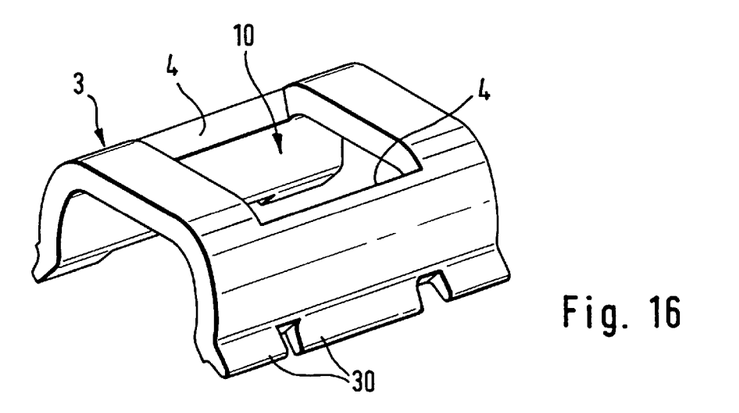
FIG. 16 shows a guiding insert with supporting lugs alternately overlapping in opposite directions and an aperture at its radially outer end.

FIG. 16 shows a complete guiding insert 3 with aperture 10 defining the axially extending side faces 4. At the radially inner open ends of guiding inserts 3, FIG. 16 shows supporting elements 30 alternately overlapping in opposite directions in partial regions.

Figure 17:
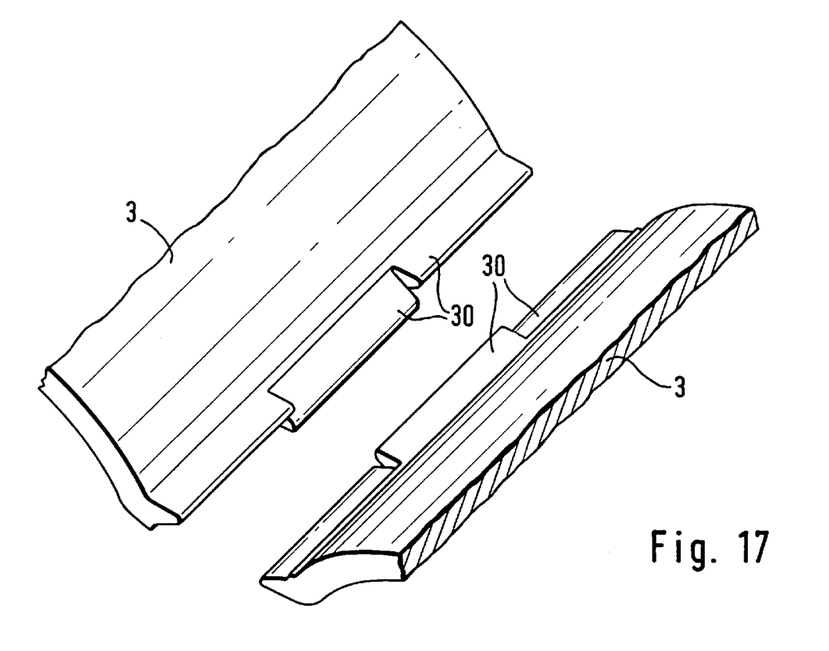
FIG. 17 is part of an illustration of two adjoining guiding inserts with cooperating supporting lugs alternately overlapping in opposite directions.

FIG. 17 shows the radially inner ends of two adjoining guiding inserts 3 comprising the axially alternately overlapping supporting elements 30. According to a further characteristic of the invention, coupling elements 16 of adjoining guiding inserts 3 are formed by supporting elements 30 alternately overlapping in opposite directions in axial partial regions. The above-described design solution for coupling elements 16 allows coupling elements 16 to be produced at reasonable cost, with the requirements in respect of accuracy not being too great.

According to a further embodiment of the present invention, coupling elements 16 of two adjoining guiding inserts are formed by a connection consisting of a tooth 25 and a tooth gap 25a corresponding to tooth 25 as shown in FIGS. 3, 4, 13 and 14.

Figure 18:
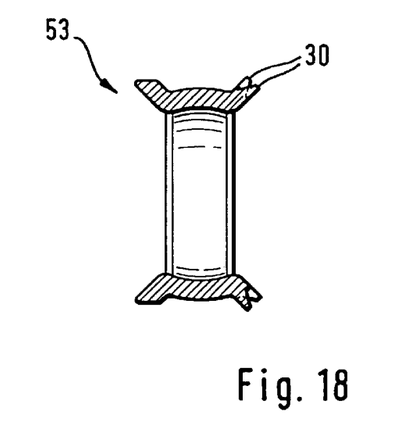
FIG. 18 is a cross-section through a guiding insert provided in the form of a flattened ring and is taken in the direction of arrows 18—18 shown in FIG. 20.

FIG. 18 shows a cross-section through guiding insert 53 of FIGS. 5, 5a and 6 designed as a flattened ring 17.

Figure 19:
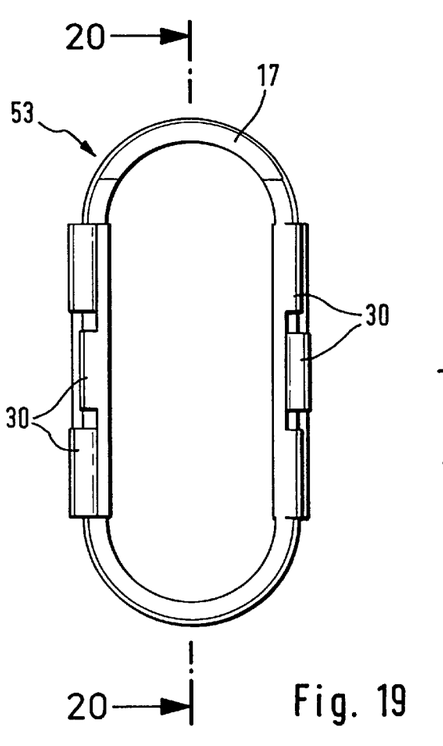
FIG. 19 is a plan view of a guiding insert according to FIG. 18.
Figure 20:
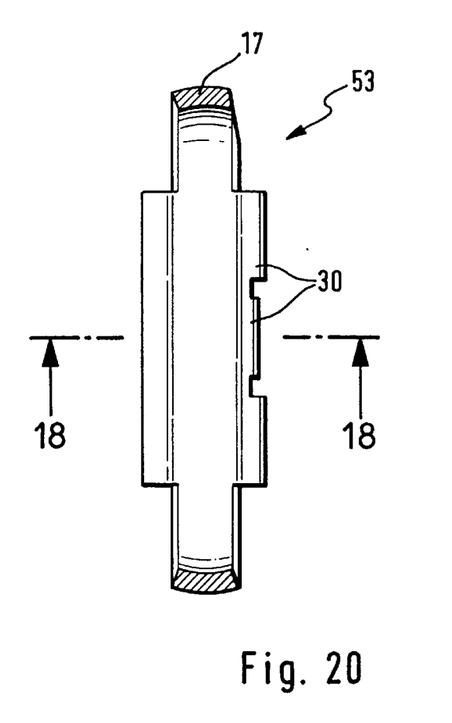
FIG. 20 is a section taken in the direction of arrows 20—20 shown in FIG. 19.

FIG. 19 shows the guiding insert 53 according to FIG. 18 in plan view, with FIG. 20 constituting a longitudinal section through the embodiment according to FIG. 19.

While the above detailed description describes the preferred embodiment of the present invention, it should be understood that the present invention is susceptible to modification, variation and alteration without deviating from the scope and fair meaning of the subjoined claims.

What is claimed is:

1. A constant velocity universal joint defining a joint axis, said joint comprising:

an outer joint part having four uniformly circumferentially distributed radially inwardly directed counter faces;

four inserts uniformly circumferentially disposed within, and pivotally mounted on said outer joint part, each of said four inserts defining two guiding tracks and an aperture in alignment with one of said counter faces, each insert further defining two coupling elements extending generally parallel to said joint axis, each coupling element being in operative engagement with a corresponding coupling element on an adjacent insert so that when adjacent inserts carry out pivot movements, said movements are of the same magnitude but in opposite directions;

an inner joint part having a center of rotation and four arms, each of said four arms extending into a respective insert, each arm defining a head which engages said counter face aligned with the aperture in said insert; and a roller disposed on each of said arms and engaging the guiding tracks in the insert in which the arm is received.

2. The constant velocity joint according to claim 1 wherein, said outer member has four uniformly circumferentially distributed inwardly directed projections on which said counter faces are provided and wherein said aperture in said insert embraces a respective projection.

3. The constant velocity joint according to claim 2 wherein, said insert pivot s on said respective projection.

4. The constant velocity joint according to claim 1 wherein, said outer joint part has four opposed pairs of axially-extending, partially-cylindrical supporting surfaces, each of said pairs of surfaces being engaged by complementary surfaces on a respective insert.

5. The constant velocity joint according to claim 4 wherein, each of said inserts comprises an oval ring and wherein the edges of said ring are formed with said complementary partially cylindrical surfaces.

6. The constant velocity joint according to claim 1 wherein, each of said inserts comprises an oval ring.

7. The constant velocity joint according to claim 1 wherein, said outer joint part includes a recess disposed adjacent each axial end of each said counter face and each of said inserts includes a pair of cam-shaped projections, one of said cam-shaped projections being pivotally received into each of said recesses.

8. The constant velocity joint according to claim 1 wherein, each of said counter faces is spherically concave, and the head of each of said arms is spherically convex and engages said spherically concave counter face to fix said center of rotation of said inner joint part relative to said outer joint part.

9. The constant velocity joint according to claim 8 wherein, said outer joint part includes a ring having four supporting lugs, each of said four supporting lugs defining a portion of one of said counter faces.

10. The constant velocity joint according to claim 1 wherein, each of said heads has a spherical convex surface and each of said counter faces is concave.

11. The constant velocity joint according to claim 1 wherein, said coupling elements of said inserts comprise supporting elements alternately overlapping in opposite directions.

12. The constant velocity joint according to claim 1 wherein, said coupling elements of said inserts comprises interengaging teeth.

13. The constant velocity joint according to claim 1 wherein, said outer joint part includes a ring having four supporting lugs, each of said four supporting lugs defining a portion of one of said counter faces.

* * * * *